July 8, 1958     E. S. MacPHERSON     2,842,394
MOTOR VEHICLE BODY

Filed Sept. 21, 1955     2 Sheets-Sheet 1

E. S. MACPHERSON
INVENTOR.

BY E. C. McRae
J. R. Faulkner
L. H. Oster

ATTORNEYS

July 8, 1958 E. S. MacPHERSON 2,842,394
MOTOR VEHICLE BODY

Filed Sept. 21, 1955 2 Sheets-Sheet 2

E.S. MacPHERSON
INVENTOR.

BY E.C. McRae
J.R. Faulkner
D.H. Oster

ATTORNEYS

United States Patent Office 2,842,394
Patented July 8, 1958

2,842,394
MOTOR VEHICLE BODY

Earle S. MacPherson, Huntington Woods, Mich., assignor to Ford Motor Company, Dearborn, Mich., a corporation of Delaware Application September 21, 1955, Serial No. 535,636

5 Claims. (Cl. 296—28)

This invention relates generally to the body construction of motor vehicles.

An object of the invention is to provide a motor vehicle body construction affording maximum visibility for the occupants of the vehicle without impairing the structural strength and safety of the body.

Current hardtop models achieve improved visibility by the elimination of the center pillar above the vehicle belt line, but accomplish this at some sacrifice of body strength and safety since an important structural tie between the body shell and the roof is eliminated. Another known construction eliminates the windshield pillars, with the windshield glass itself forming the structural support for the forward portion of the vehicle roof. It is also known in the art to provide a roll bar or hoop shaped structural member located interiorly of the body to afford safety in the event the vehicle overturns.

The present invention incorporates a combination of the three above described body constructions, combining them with additional structure in such a manner as to afford greatly improved visibility for both the front and rear seat passengers while at the same time providing adequate structural strength between the lower portion of the vehicle body and the roof. In addition, the present construction provides added safety for the occupants against side crashes and accidents in which the vehicle overturns. This is accomplished in the present instance by providing a vehicle body in which the usual windshield pillars are completely eliminated and in which the forward portion of a cantilever type vehicle roof is supported by the windshield glass. The center pillars terminate at the vehicle belt line, but instead of being supported only at their lower portions as in the case of four door hardtop models, the short center pillars are tied together by an arched supported bar spanning the interior width of the vehicle body with its central portion positioned closely adjacent the roof panel. The opposite lower ends of the arched supporting bar are rigidly connected to the pillars, and the bar is also connected at opposite sides of the vehicle body to the side roof rails, thus tying the body and roof together. The bar is spaced inwardly from the plane of the vehicle windows to provide hand clearance therebetween, and being of relatively small cross section does not substantially interfere with visibility.

Other objects and advantages of this invention will be made more apparent as this description proceeds, particularly when considered in connection with the accompanying drawings, wherein.

Figures 1, 2:
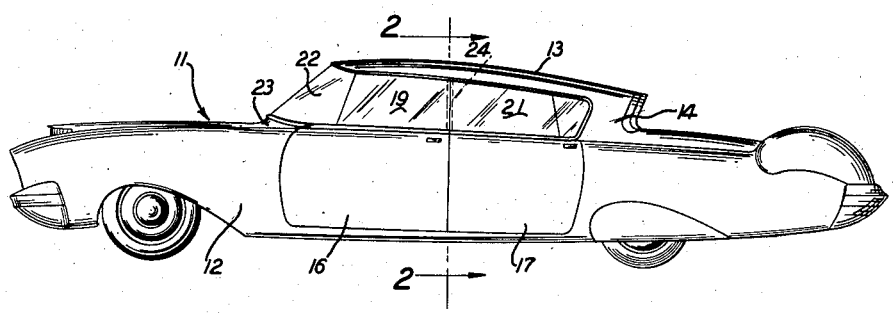
Figure 1 is a side elevational view of a motor vehicle incorporating the present invention.
Figure 2 is a vertical transverse cross sectional view taken substantially on the plane indicated by the line 2—2 of Figure 1.
Figures 3, 4:
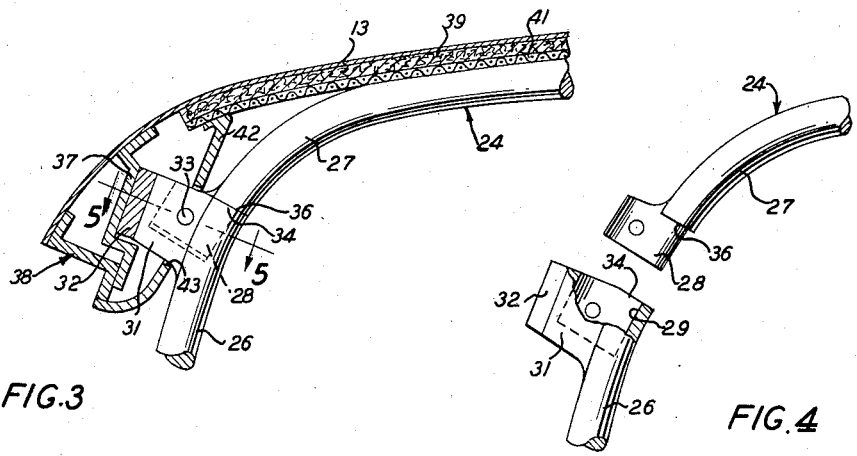
Figure 3 is an enlarged cross sectional view of a portion of Figure 2.
Figure 4 is a fragmentary exploded view showing two parts of the supporting bar prior to their interconnection.

Referring now to the drawings, and particularly to Figures 1 and 2, the reference character 11 indicates generally a motor vehicle body having a lower body structure 12 and a roof structure 13. The roof structure 13 is joined to the quarter panel structure 14 of the body adjacent the rearward portion of the roof.

The front and rear doors 16 and 17 are separated by a short center pillar 18 terminating at the vehicle belt line, and the doors receive vertically slidable front and rear windows 19 and 21 respectively. The adjoining edges of the front and rear windows 19 and 21 are positioned adjacent each other in the raised position of the windows, with the joint therebetween being sealed by a narrow weatherstrip mounted upon the edge of one window and resiliently engaging the adjacent edge of the window.

The usual windshield pillars joining the lower body structure and the roof structure adjacent the rearward edges of the windshield are eliminated in this construction, the windshield 22 forming a structural member and being connected along its lower edge to the cowl 23 and along its upper edge to the roof 13.

It will be seen that the foregoing construction provides excellent visibility for the occupants of both the front and rear seats. In addition, structure is provided insuring adequate strength for the roof structure and safety for the occupants.

An arched supporting bar 24 is located generally in transverse alignment with the short center pillars 18, and is best shown in Figures 2 to 6 inclusive. While the bar may be a fabricated truss member if desired, it is shown in the present instance as a solid bar oval in cross section. The supporting bar 24 is formed of two side sections 26 and an interconnecting central section 27. The lower end of the central section 27 of the bar is formed with a narrow depending tongue 28 insertable into a correspondingly shaped recess 29 provided in the upper portion of the side section 26 of the bar. The upper portion of the lower section 26 of the bar is formed with an integral web 31 interconnecting the oval shaped portion of the bar with an integral elongated mounting flange 32. The recess 29 is formed partially in the web 31 and partially in the oval shaped section of the bar. A pin 33 extends through aligned apertures in the tongue 28 and the web 31 to secure the portions of the bar in assembled relationship. In this assembled position the upper and lower edges 34 and 36 of the lower and upper bar sections 26 and 27 respectively abut each other to provide for the transfer of load therebetween. If desired, of course, the entire arched supporting bar 24 may be formed as a single member.

The elongated mounting flange 32 of the supporting bar 24 is positioned adjacent the flange 37 of the side roof rail 38 and suitably secured thereto by means of bolts, rivets, or welding.

To minimize vehicle height, a relatively thin roof construction is provided in which an insulating layer 39 is suitably secured to the underside of the roof panel 13, with a trim material 41 secured to the insulating layer to form a built-up roof section. The trim material 41 may, for example, be a carpeting type material or other headlining material. A molding 42 conceals the edges of the insulating layer 39 and trim material 41 and likewise conceals the roof rail 38. An aperture 43 is provided in the molding 42 embracing the web portion 31 of the arched supporting bar 24.

Figure 6:
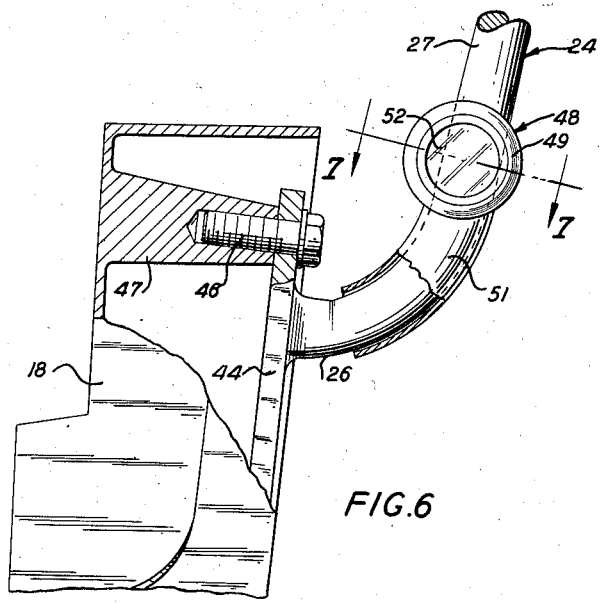
Figure 6 is an enlarged elevational view, partly broken away and in section, of the lower portion of the supporting bar and the pillar construction.

Referring now to Figures 2 and 6, the lower portion of the lower section 26 of the arched supporting bar 24 is curved outwardly and is formed at its terminal end with an integral vertically extending mounting flange 44. The mounting flange 44 is positioned adjacent the short center pillar 18 and is rigidly secured thereto by means of three vertically spaced studs 46 threadedly engaging tapped holes in bosses 47 formed in the center pillar 18. The pillar 18 is conventionally supported at its lower portion upon the vehicle body structure and it will be seen that the arched supporting bar 24 joins the center pillars 18 at opposite sides of the vehicle and is also connected to the side roof rails 38 to form a structure enhancing the strength and rigidity of the vehicle body. With the roof rails thus supported centrally of the vehicle body, the roof structure 13 forwardly thereof forms a cantilever which is additionally supported at its forward edge by the load carrying windshield 22. A body structure is thus formed having excellent characteristics insofar as resisting the various loads to which a vehicle body is subjected during operation. In addition, the arched supporting bar 24 provides an added safety feature in that it guards against body or roof collapse in the event of a side crash or an accident resulting in overturning of the vehicle.

Since the arched supporting bar 24 is relatively small in cross section it does not substantially impair the visibility afforded the occupants of the rear seat. In addition, it does not detract from the exterior appearance of the vehicle since it is located inwardly of the front and rear windows 19 and 21 respectively, which abut each other to form an unbroken glass exposure as viewed from the exterior of the vehicle.

It will be noted that the lower sections 26 of the arched supporting member 24 are spaced inwardly an appreciable distance from the plane of the windows to provide hand clearance therebetween as well as to enhance the appearance. The central portion of the upper section 27 of the supporting bar 31 is preferably positioned in direct engagement with the headlining material 41 of the roof to provide support to the thin roof assembly and to prevent vibration thereof. In addition, the bar is effective in hiding a seam between the forward and rearward portions of the headlining so that economical widths of material may be used for the headlining while at the same time achieving an over-all one-piece appearance.

Figures 5, 7:
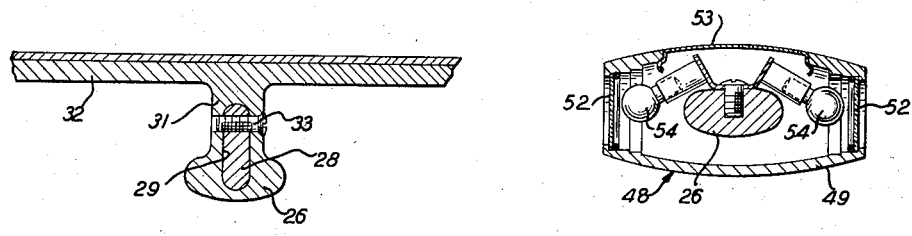
Figure 5 is a cross sectional view taken on the line 5—5 of Figure 3.
Figure 7 is a cross sectional view taken on the line 7—7 of Figure 6.

Referring now to Figures 6 and 7, a decorative courtesy light enclosure 48 is mounted upon the lower portion of each side section 26 of the supporting bar. The enclosure comprises a generally cylindrical housing 49 welded to an arcuate tube 51 encircling and secured to the lower curved portion of the side section 26 of the bar. A translucent lense 52 inserted into each end of the housing 49 and a removeable translucent cover 53 is snapped into an opening in the housing at the outboard side thereof. Light sources 54 are arranged in such manner as to provide adequate illumination both forwardly and rearwarly as well as exteriorly of the enclosure 48 to provide illumination in the zone of the vehicle doors.

It will be understood that the invention is not to be limited to the exact construction shown and described, but that various changes and modifications may be made without departing from the spirit and scope of the invention, as defined in the appended claims.

What is claimed is:

1. In a motor vehicle body having a pair of hinged doors at each side thereof, a center pillar extending vertically between the pair of doors at each side of the vehicle and secured at its lower end to said body, said pillar terminating at its upper end adjacent the belt line of said body, a window in each of said doors moveable generally vertically and arranged to have their adjacent edges positioned closely adjacent each other in the raised position of said windows at each side of said vehicle to provide a substantially unbroken glass wall at each side of the vehicle, a roof rail at each side of the body spaced above the upper ends of said center pillars, a roof panel secured to said roof rails, an inverted U-shaped supporting bar extending transversely within said vehicle and having its upper portion positioned closely adjacent said roof panel, the side portions of said U-shaped supporting bar extending generally vertically and spaced inwardly an appreciable distance from the planes of said windows, the lower extremities of the side portions of said bar having outwardly projecting portions terminating in vertically elongated flanges secured to said center pillars to interconnect and reinforce the latter, said inverted U-shaped bar passing said roof rails adjacent the inboard sides thereof, and attaching portions on said bar interconnecting the latter to each of said roof rails to support and reinforce the latter.

2. The structure defined by claim 1 which is further characterized in that said roof panel has a lining material secured to the lower side thereof, the center portion of said inverted U-shaped supporting bar abutting said lining material to provide support for said roof panel.

3. In a motor vehicle body having a pair of hinged doors at each side thereof, a center pillar extending vertically between the pair of doors at each side of the vehicle and secured at its lower end to said body, said pillar terminating at its upper end adjacent the belt line of said body, a window in each of said doors movable generally vertically and arranged to have their adjacent edges positioned closely adjacent each other in the raised position of said windows to provide a substantially unbroken glass wall at each side of the vehicle, a roof rail at each side of the body spaced above the upper ends of said center pillars, a roof panel secured to said roof rails, an inverted U-shaped supporting bar extending transversely within said vehicle and having its upper portion positioned closely adjacent said roof panel, said U-shaped bar having separate side portions and a separate upper portion interconnecting said side portions, the upper extremities of said side portions having outwardly projecting flanges connected to said roof rails, said flanges having upwardly facing sockets formed therein, the opposite ends of the upper portion of said bar projecting into said sockets for interconnection with the side portions of said bar, and the lower extremities of the side portions of said bar being secured to said center pillars to interconnect and reinforce the latter.

4. In a motor vehicle body having a door at each side thereof, a body pillar extending vertically at the rearward edge of each door and secured to said body, said pillars terminating at their upper ends adjacent the belt line of said body, a window in each door and a window in each side of said body rearwardly of said door windows, and arranged to have their adjacent edges positioned closely adjacent each other in the raised position of said windows at each side of said vehicle to provide a substantially unbroken glass wall at each side of the vehicle, a roof rail at each side of the body spaced above the upper ends of said center pillars, a roof panel secured to said roof rails, an inverted U-shaped supporting bar extending transversely within said vehicle and having its upper portion positioned closely adjacent said roof panel, the side portions of said U-shaped supporting bar extending generally vertically and spaced inwardly an appreciable distance from the planes of said windows, the lower extremities of the side portions of said bar having outwardly projecting portions terminating in vertically elongated flanges secured to said body pillars to interconnect and reinforce the latter, said inverted U-shaped bar passing said roof rails adjacent the inboard sides thereof, and attaching portions on said bar interconnecting the latter to each of said roof rails to support and reinforce the latter.

5. In a motor vehicle body having a pair of hinged doors at each side thereof, a center pillar extending vertically between the pair of doors at each side of the vehicle and secured at its lower end to said body, said pillar terminating at its upper end adjacent the belt line of said body, a window in each of said doors movable generally vertically and arranged to have their adjacent edges positioned closely adjacent each other in the raised position of said windows at each side of said vehicle to provide a substantially unbroken glass wall at each side of the vehicle, a roof panel for said vehicle body spaced above the upper ends of said center pillars, an inverted U-shaped supporting bar extending transversely within said vehicle and having its upper portion positioned closely adjacent said roof panel, the side portions of said U-shaped supporting bar extending generally vertically and spaced inwardly and appreciable distance from the planes of said windows, the lower extremities of the side portions of said bar being secured to said center pillars to interconnect and reinforce the latter, and means attaching said bar to said roof panel adjacent the opposite sides thereof to support and reinforce the latter.

References Cited in the file of this patent

UNITED STATES PATENTS

| | | |
|---|---|---|
| D. 133,122 | Walker | July 21, 1942 |
| 2,028,143 | Carr | Jan. 21, 1936 |
| 2,157,366 | Vigroux | May 9, 1939 |
| 2,373,214 | Wolkenhauer | Apr. 10, 1945 |
| 2,437,664 | Hicks | Mar. 9, 1948 |
| 2,556,062 | Buehrig | June 5, 1951 |
| 2,596,309 | Urich | May 13, 1952 |
| 2,626,180 | Thompson | Jan. 20, 1953 |

OTHER REFERENCES

"Design for the future," in Time magazine, May 25, 1942, page 17.